Patented Sept. 11, 1923.

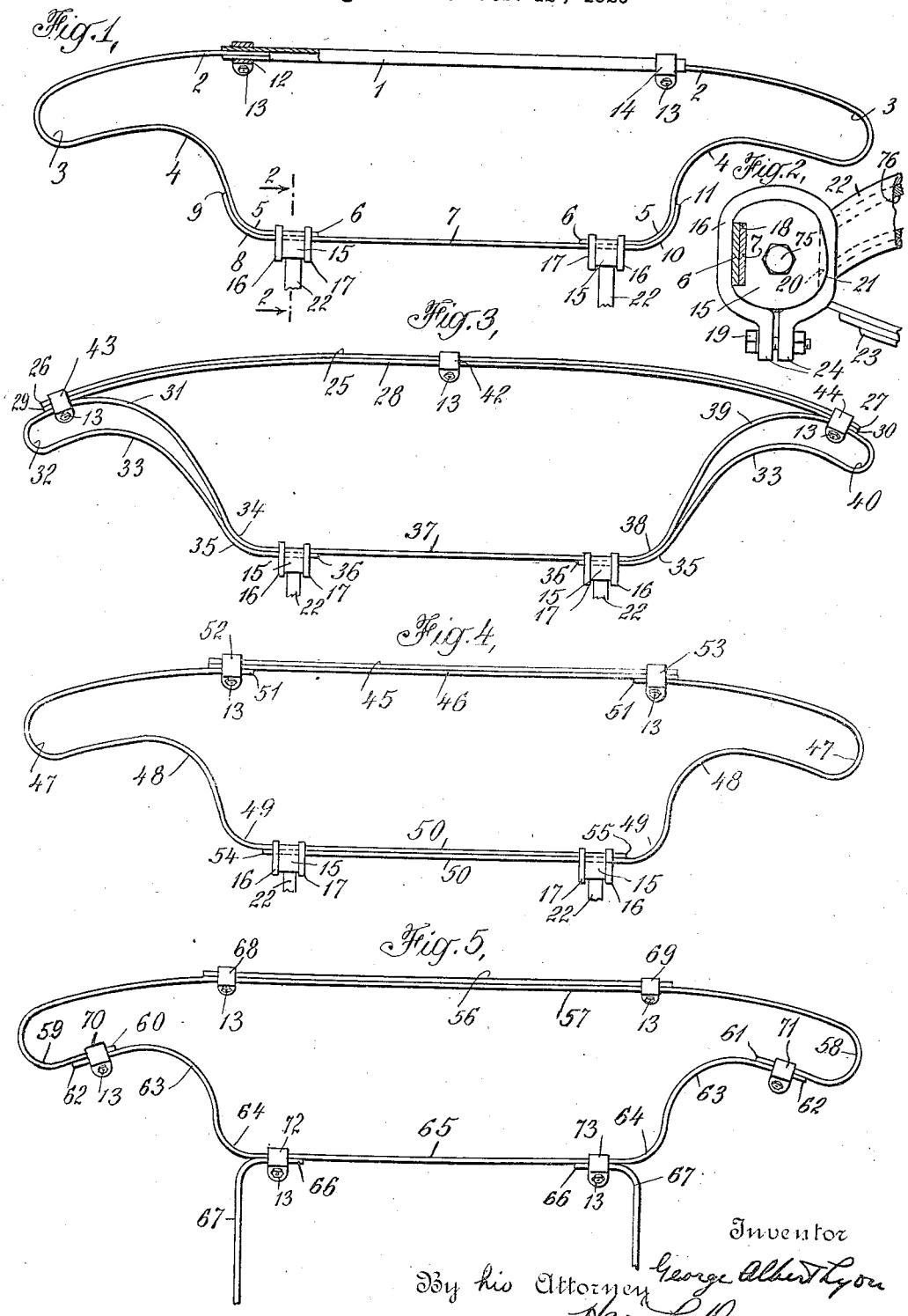

1,467,384

UNITED STATES PATENT OFFICE.

GEORGE ALBERT LYON, OF PHILADELPHIA, PENNSYLVANIA.

BRACE-BAR AUTOMOBILE BUFFER.

Application filed February 12, 1920, Serial No. 358,239. Renewed January 11, 1923. Serial No. 534,275.

*To all whom it may concern:*

Be it known that I, GEORGE ALBERT LYON, a citizen of the United States, and resident of Philadelphia, county of Philadelphia, State of Pennsylvania, have made certain new and useful Inventions Relating to Brace-Bar Automobile Buffers, of which the following is a specification, taken in connection with the accompanying drawing.

This invention relates especially to automobile buffers with which may be combined brace bars, supporting members, or auxiliary buffer portions which may be secured or connected to the automobile or other vehicle frame members to reenforce and strengthen them. For this purpose special frame ends which may be riveted or otherwise connected to the forward ends or portions of the usual channel section frame members of the vehicle may advantageously be provided with laterally extending supporting bosses on one or both sides of each frame member and an enclosing supporting clamp may cooperate with each boss which, if desired, may be recessed to receive and align the brace bar portion. The supporting boss may, if desired, have retainer lugs or portions and aligning faces to engage and align the supporting clamp which may enclose the boss and cooperating brace bar or other supporting portions of the buffer so that the brace bar portions may thus be securely clamped or connected to each of the frame members so as to have a desirable reenforcing action thereon and at the same time support the buffer front of any suitable construction which may be in the same plane or bent upwards in some cases so as to be arranged in a higher plane than the connected rear supporting portions. The brace bar or supporting portions may, if desired, have integrally or otherwise connected end loops and adjacent inturned connector portions to which may be detachably or otherwise connected the buffer front portions preferably formed of spring strip or other resilient elements, so that these impact receiving members may have the desired resilient action under collision conditions. It is sometimes desirable to form the brace bar or supporting portion of the buffer of one or more pieces of resilient spring steel strip which may have double looped end portions extending out into protective position in front of the vehicle wheels so as to form the end loops for the buffer while the connected duplex portions give additional strength and reliability to this part of the construction and furnish a desirable connection for the spring strip or other impact receiving member which may be clamped or otherwise connected thereto.

In the accompanying drawing showing in a somewhat diagrammatic way various illustrative embodiments of this invention, Fig. 1 is a plan view partly in section showing one form of construction.

Fig. 2 is an enlarged side sectional view taken approximately along the line 2—2 of Fig. 1; and Figs. 3, 4 and 5 are plan views showing other illustrative forms of buffer.

In the illustrative embodiment of the invention shown in Fig. 1, the brace bar or supporting portion of the buffer may comprise one or more connected strips of spring steel or other suitable and preferably resilient material having end loop portions. As illustrated the brace bar portion or strip 7 may extend beyond the special frame ends or supporting bosses 15 and be provided with stiffening connector portions 8, 9, and 10, 11 which may extend behind and around the cooperating connector portions 5, 6 which may have the integral end loops 3 and curved resilient portions 4 as well as the front connector portions 2, if desired. In this case the buffer front or impact receiving portions may comprise the spring channel 1 cooperating with the front connector portions and if desired having more or less aligning action thereon, these parts being connected by the enclosing clamping devices or clips 12, 14 which may be tightened around the parts by the bolts or nuts 13.

The supporting or brace bar portions of the buffer may as indicated in Fig. 2 be clamped or connected to supporting bosses 15 which may extend on one or both sides of the special frame ends rigidly connected to the usual channeled frame members or goosenecks 22. Any convenient means for connecting these parts may be used and as indicated the supporting boss which may project on both sides of the frame member may be formed with an integral connecting or securing portion 76 extending within the channeled frame member and welded, riveted or otherwise connected thereto in a rigid way. This supporting boss may of course accommodate the end of the usual spring 23 which may be secured by a spring hanger bolt 75 passing through the boss if desired. This supporting boss may be formed with a recess 18 of such size as to accommodate the one or more spring strips constituting this supporting brace bar portion of the buffer and a straight or rectangular sectioned recess of this character may support the flat sectioned strips as indicated in Fig. 2 in connection with a supporting clamp, such as 16, which may be arranged around these parts and strongly clamped upon the same as by tightening bolt 19 passing through the ends 24 of this clamp. It is usually advantageous to form the one or more bosses provided on each frame member with a retainer lug or portion such as 21 projecting outward to at least a slight extent beyond the cooperating face 20 of the boss which may be substantially flat or vertical, if desired. The supporting clamp of wrought or malleable material may be sufficiently expanded to be slipped over this retainer portion and then tightened inside the same which definitely holds the parts in this securing position and positively prevents the clamp slipping sidewise from the supporting boss. As indicated in Fig. 1 two such supporting clamps 16, 17 may be used on each supporting boss or frame end 15 and in this way an amply strong and rigid connection may be secured between the supporting or brace bar portion of the buffer and the frame ends so as to considerably strengthen and reenforce them against lateral yielding and breakage.

Fig. 3 shows another form of buffer in which the brace bar or auxiliary rear portion may be formed of one or more strips of tempered spring steel or other resilient strip and may have double looped end portions so as to form the integral end loops 32, 40 and cooperating inturned connector portions extending out into protective position adjacent the vehicle wheels, if desired. The end loop 32 may have the duplex connected portions 31, 33 of the strip which may be brought together at 34, 35 adjacent the ends of this brace bar supporting portion 37 so that these duplex ends or portions thereof may be securely clamped to the supporting bosses 15 as by the supporting clamps 16, 17 of generally similar construction. Any one or more strips on the other side of the brace bar portion may have the end loop 40 similarly supported by duplex portions 33, 39 and 35, 38 which, if desired, may be integral with the strip on the other side of the supporting or brace bar element, although this is not of course necessary in all cases. The buffer front may in this case be formed of one or more strips or elements of spring steel or other resilient material, such as 25, 28, which may have the ends 26, 29 extend out toward or beyond the end loop portion 32 or the adjacent inwardly extending connector portion cooperating therewith to which they may be clamped or connected as by the enclosing clamping device or clip 43 having the bolt or nut 13. The other ends 27, 30 of such usual impact receiving strips or members may be similarly connected to the connector portion adjacent the other end loop portion 40 by a similar clamping device or clip 43 while one or more intermediate clips 42 may be used on this type of front portion.

Fig. 4 shows another construction in which the brace bar portion comprises two superimposed strips 50 each having integral end loops 47 and connected curved portions 48, 49, while, if desired, the integral inturned front connector portion 51 may be formed on each strip. These two brace bar strips 50 may overlap each other throughout the distance between the supporting members or bosses 15 and this makes the buffer adjustable to a considerable extent, since the ends 54, 55 of these strips may be slid toward each other before the superimposed supporting portions are clamped or connected to the frame ends or any other suitable parts of the automobile or vehicle. These front connector portions 51 may be clamped or connected to any suitable buffer front or impact receiving members, such as the spring strips 45, 46 and for this purpose the enclosing clips or clamping devices 52, 53 may be used and clamped around these strips by the tightening bolts 13.

Fig. 5 shows another form of construction in which the supporting or brace bar portion 65 may be a single strip of spring steel or other resilient material having the outwardly extending connector portions 62 and the curved portions 63, 64 which give greater resilient yield to the parts. The buffer front may in this instance comprise one or more strips having end loops 58, 59 and inturned connector portions or ends 60, 61 to be clamped or connected to the cooperating connector portion 62 as by the enclosing clips 70, 71. When as illustrated the impact receiving or front portion of the buffer comprises two overlapping strips 56, 57 a considerable degree of lateral adjustment is thus secured and these front strips may be clamped in any desired adjusted position by the enclosing clamps 68, 69. The supporting portion 65 of this type of buffer may be similarly clamped or connected to the automobile frame members in the manner previously described, or if desired, other supporting devices may be used on this or other illustrated types of construction, and for this purpose separate attaching members, such as 67, which may be clamped or connected to the automobile frame members, may be formed with bent connector portions 66, so that they can be connected as by the clamping devices or clips 72, 73 to this supporting or transverse portion 65 of the buffer. It is thus unnecessary to directly connect this or the other types of buffer to special supporting bosses such as illustrated in Fig. 2.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims:

1. In automobile buffers, a resilient spring strip supporting portion having integral end loops adapted to project into protective position adjacent the vehicle wheels and connected double curved portions having inwardly extending ends, and spring strip impact receiving members detachably clamped to said end loops to form a resilient buffer front in connection therewith.

2. In automobile buffers, a resilient spring strip supporting portion having end loops adapted to project into protective position adjacent the vehicle wheels, and resilient impact receiving members clamped to said end loops to form a resilient buffer front in connection therewith.

3. In automobile buffers, an adjustable width supporting portion comprising multiple resilient elements having forwardly and outwardly extending integral end loops adapted to extend into protective position adjacent the vehicle wheels and having inturned connector portions and a resilient strip buffer front member adapted to be disengageably connected to said connector portions adjacent said end loops.

4. In automobile buffers, a supporting portion comprising multiple resilient elements having forwardly and outwardly extending end loops adapted to extend into protective position adjacent the vehicle wheels and having inturned connector portions and a buffer front member adapted to be disengageably connected to said connector portions adjacent said end loops.

5. In automobile buffers, a resilient strip brace bar supporting portion adapted to be connected between the vehicle frame members and having forwardly and outwardly extending integral end loops adapted to extend into protective position adjacent the vehicle wheels and having inturned connector portions and a resilient buffer front member adapted to be disengageably connected to said connector portions adjacent said end loops.

6. In automobile buffers, a resilient spring strip supporting brace bar portion having integral end loops adapted to project into protective position in front of the vehicle wheels, supporting bosses connected to the vehicle frame members and projecting laterally therefrom and formed with aligning recesses adapted to accommodate said doubled brace bar portions, supporting clamps to enclose said brace bar portions and bosses to securely clamp said brace bar portions to the vehicle frame members and reenforce the same and spring strip impact receiving front members detachably clamped to said end loops to form a resilient buffer front in connection therewith.

7. In automobile buffers, a resilient spring strip supporting brace bar portion having end loops adapted to project into protective position in front of the vehicle wheels, supporting bosses connected to the vehicle frame members and projecting laterally therefrom, supporting clamps to enclose said brace bar portions and bosses to securely clamp said brace bar portions to the vehicle frame members and reenforce the same and impact receiving front members connected to said end loops to form a resilient buffer front in connection therewith.

8. In attaching devices to detachably support an automobile buffer, a supporting frame end having an integral securing portion adapted to be connected to the end of the automobile frame member, said frame end being formed to accommodate a spring hanger and a spring hanger bolt, said frame end being formed with supporting bosses projecting laterally on both sides of said frame member, and enclosing supporting clamps to be detachably clamped around said bosses and the supporting members of the buffer to rigidly connect said supporting members to said frame end, said supporting bosses and clamps being formed with cooperating recesses to accommodate and align said supporting members.

9. In attaching devices to detachably support an automobile buffer, a supporting frame end having a securing portion adapted to be connected to the end of the automobile frame member, said frame end being formed to accommodate a spring hanger, said frame end being formed with a supporting boss projecting laterally from said frame member, and an enclosing supporting clamp to be detachably clamped around said boss and the supporting members of the buffer to rigidly connect said supporting members to said frame end.

10. In attaching devices to detachably support an automobile buffer, a pair of supporting frame ends each having an integral securing portion adapted to be connected to the end of the automobile frame members, each frame end being formed to accommodate a spring hanger, a spring hanger bolt extending transversely through said frame end, said frame ends being formed with recesses extending transversely across the vehicle to accommodate the strip supporting members of the buffer and with supporting bosses projecting laterally on both sides of said frame members, and enclosing supporting clamps to be detachably clamped around said bosses and supporting members to rigidly connect said supporting members to said frame ends.

11. In attaching devices to detachably support an automobile buffer, a pair of supporting frame ends adapted to be connected to the end of the automobile frame members, each frame end being formed to accommodate a spring hanger, said frame ends being formed with recesses extending transversely across the vehicle to accommodate the strip supporting member of the buffer and with supporting bosses projecting laterally from said frame members and supporting clamps to rigidly connect said supporting member to said frame end.

12. In attaching devices to detachably support an automobile buffer, a supporting frame end adapted to be connected to the end of the automobile frame member, said frame end being formed to accommodate a spring end and spring hanger bolt, said frame end being formed with a recess to accommodate the transversely extending strip supporting member of the buffer and being formed with supporting bosses projecting laterally from both sides of said frame member, and supporting clamps to be detachably clamped around said bosses and supporting members to connect said supporting member to said frame end.

13. In attaching devices to detachably support an automobile buffer, a supporting frame end adapted to be connected to the end of the automobile frame member, said frame end being formed to accommodate a spring end, said frame end being formed with means to prevent undesirable angular depresion of the transversely extending strip supporting members of the buffer and being formed with supporting bosses projecting laterally from said frame member, and supporting clamps to connect said supporting members to said frame end.

14. In attaching devices to detachably support an automobile buffer, a supporting frame end having a securing portion adapted to be connected to the end of the automobile frame member, said frame end being formed with means to accommodate and support an end of one of the vehicle springs, said frame end being formed with integral supporting bosses projecting laterally from both sides of said frame member, and supporting clamping devices to detachably clamp to said bosses the transversely extending supporting member of the buffer to rigidly connect said supporting member to said frame end.

15. In attaching devices to detachably support an automobile buffer, a supporting frame end having a securing portion adapted to be connected to the end of the automobile frame member, said frame end being formed with means to accommodate and support an end of one of the vehicle springs, said frame end being formed with a supporting boss projecting laterally from said frame member, and supporting clamping devices to detachably clamp said boss to the transversely extending supporting member of the buffer to rigidly connect said supporting member to said frame end.

16. In attaching devices to detachably support an automobile buffer, automobile frame members, a pair of supporting frame ends connected to the ends of the corresponding automobile frame members, said frame ends being formed with recesses extending transversely across the vehicle to accommodate the strip supporting member of the buffer and with supporting bosses projecting laterally from said frame members and supporting clamps to rigidly connect said supporting member to said frame ends.

17. In attaching devices to detachably support an automobile buffer, automobile frame members, a pair of supporting frame ends connected to the ends of the corresponding automobile frame members, said frame ends being formed with recesses extending transversely across the vehicle to accommodate the strip supporting member of the buffer and supporting clamps to rigidly connect said supporting member to said frame ends.

18. In attaching devices to detachably support an automobile buffer, channeled automobile frame members, a pair of supporting frame ends each having an integral portion connected to the end of the corresponding automobile frame member, each frame end being formed to accommodate a spring hanger, a spring hanger bolt extending transversely through said frame end, said frame ends being formed with recessed flat supporting faces extending transversely across the vehicle to accommodate the supporting members of the buffer and with portions projecting laterally from said frame members, and supporting clamps to rigidly connect said supporting members to said frame ends.

19. In attaching devices to detachably support an automobile buffer, channeled automobile frame members, a pair of supporting frame ends each having an integral portion connected to the end of the corresponding automobile frame member, each frame end being formed to accommodate a spring hanger, said frame ends being formed with flat supporting faces to accommodate the supporting members of the buffer, and supporting clamps to rigidly connect said supporting members to said frame ends.

20. In attaching devices to detachably support an automobile buffer, automobile frame members, supporting frame ends connected to the ends of the automobile frame members, each of said frame ends being formed to accommodate a spring end and spring hanger bolt, said frame ends being formed with recessed aligning contact portions to accommodate the transversely extending strip supporting member of the buffer and prevent undesirable angular movement thereof and being formed with supporting portions projecting laterally from both sides of said frame members and supporting clamping means to connect said supporting member to said frame ends.

21. In attaching devices to detachably support an automobile buffer, automobile frame members, supporting frame ends connected to the ends of the automobile frame members, each of said frame ends being formed to accommodate a spring end and spring hanger bolt, said frame ends being formed with aligning contact portions to accommodate the transversely extending supporting member of the buffer and prevent undesirable angular movement thereof and supporting clamping means to connect said supporting member to said frame ends.

22. In attaching devices to detachably support an automobile buffer, a supporting frame end adapted to be rigidly and permanently connected to the end of the automobile frame member, said frame end being formed to accommodate a spring end, said frame end being formed with a substantially flat aligning contact portion to prevent undesirable angular movement of the transversely extending strip supporting member of the buffer and being formed with a portion projecting laterally from said frame member, and supporting clamps to connect said supporting member to said frame end.

23. In attaching devices to detachably support an automobile buffer, a supporting frame end adapted to be rigidly connected to the end of the automobile frame member, said frame end being formed to accommodate a spring end, said frame end being formed with a contact portion to prevent undesirable angular movement of the transversely extending supporting member of the buffer, and supporting clamps to connect said supporting member to said frame end.

24. In attaching devices to detachably support an automobile buffer, a supporting frame end having a portion adapted to be connected to the end of the automobile frame member, said frame end being formed with means to accommodate and support an end of one of the vehicle springs, said frame end being formed with an integral forwardly projecting substantially flat supporting face projecting laterally from both sides of said frame member, and supporting clamping devices to detachably clamp to said face the transversely extending supporting member of the buffer to rigidly connect said supporting member to said frame end.

25. In attaching devices to detachably support an automobile buffer, a supporting frame end having a portion adapted to be connected to the end of the automobile frame member, said frame end being formed with a substantially flat supporting face, and supporting clamping devices to detachably clamp to said face the transversely extending supporting member of the buffer to rigidly connect said supporting member to said frame end.

26. A fitting adapted to be permanently fixed to the end of a vehicle frame member, and comprising a head projecting beyond the end of the frame member, and an integral support for a bumper.

27. A fitting adapted to be permanently connected at the end of a vehicle frame member, and comprising a shank portion extending lengthwise of said frame member, a head adapted to be connected with the end of a vehicle spring, and an integral support for the attaching member of the bumper.

28. A bumper attaching fitting adapted to be permanently built into the end of a vehicle frame member, and comprising a shank portion adapted for overlapping connection with said frame member, a head beyond the end of the frame member, and a support for a bumper integral with said head.

29. In attaching devices to detachably support an automobile buffer, a supporting frame end having a securing portion adapted for permanent built in connection with the end of an automobile frame member, said frame end being formed with spring hanger connections and with a recessed supporting portion adapted to extend beyond the end of said frame member and having a substantially vertical transverse contact face with which a transverse buffer member is adapted to cooperate and supporting clamping means to enclose and clamp said buffer member thereto.

30. In attaching devices to detachably support an automobile buffer, a supporting frame end having a securing portion adapted for permanent built in connection with the end of an automobile frame member, said frame end being formed with spring hanger connections and with a supporting portion adapted to extend beyond the end of said frame member and having a substantially flat contact face with which a transverse buffer member is adapted to cooperate and supporting clamping means to connect said buffer member thereto.

31. In attaching devices to detachably support an automobile buffer, a supporting frame end having a securing portion adapted for permanent built in connection with the end of an automobile frame member, said frame end being formed with an integral head beyond the end of said frame member and provided with a recessed supporting portion having a substantially vertical face with which a transverse buffer member is adapted to cooperate and supporting clamping means adapted to clamp said buffer member thereto.

32. In attaching devices to detachably support an automobile buffer, a supporting frame end having a securing portion adapted for permanent built in connection with the end of an automobile frame member, said frame end being formed with an integral head beyond the end of said frame member and provided with a substantially vertical face with which a transverse buffer member is adapted to cooperate.

33. In automobile buffer attaching devices, channel sectioned automobile frame members having depending forward portions, supporting frame ends having integral securing portions extending into the channels of the frame members and rigidly and permanently connected thereto, said frame ends being formed with spring hanger connections and being formed with aligning recesses extending transversely with respect to the automobile to accommodate strip supporting portions of the automobile buffer and having substantially vertical contact faces to be engaged by the transverse buffer supporting portions, and cooperating clamping devices adapted to rigidly connect the buffer supporting portions thereto.

34. In automobile buffer attaching devices, channel sectioned automobile frame members having depending terminal portions, supporting frame ends having securing portions extending into the channels of the frame members and rigidly connected thereto, said frame ends being formed with spring hanger connections and being formed with contact faces to be engaged by the transverse buffer supporting portions, and cooperating clamping devices adapted to rigidly connect the buffer supporting portions thereto.

35. In buffer attaching devices, channel sectioned automobile frame members having depending forward portions, supporting frame ends having integral securing portions extending into the channels of the frame members and permanently riveted thereto, said frame ends being formed to accommodate a spring hanger and spring bolt and being formed with substantially vertical contact faces extending transversely with respect to the vehicle to engage strip supporting portions of the automobile buffer, and clamping devices adapted to rigidly connect the buffer supporting portions thereto.

36. In buffer attaching devices, channel section automobile frame members, supporting frame ends having integral securing portions extending into the channels of the frame members and permanently connected thereto, said frame ends being formed with substantially vertical contact faces extending transversely with respect to the vehicle to engage supporting portions of the automobile buffer.

37. In automobile buffer attaching devices, channel section automoible frame members having depending forward portions, supporting frame ends having integral securing portions extending into the channels of the frame members and permanently connected thereto, said frame ends being formed with spring hanger connections and being formed with supporting contact faces extending transversely with respect to the automobile and having such contour as to aligningly engage the transverse supporting portions of the automobile buffer, and clamping devices adapted to rigidly connect the buffer supporting portions thereto.

38. In automobile buffers, channel iron automobile frame members, supporting members having portions rigidly and permanently connected to said automobile frame members and projecting forwardly therefrom and formed with spring connections and with supporting portions adapted to cooperate with the supporting portion of the buffer.

39. In automobile buffers, channel iron automobile frame members, supporting members rigidly riveted to said automobile frame members and projecting laterally therefrom and formed with supporting portions adapted to cooperate with and engage the supporting portion of said buffer, and connecting means adapted to engage and rigidly connect said supporting members and the supporting portions of said buffer.

40. In automobile buffers, automobile frame members, supporting members rigidly riveted to said automobile frame members and formed with supporting portions adapted to cooperate with the supporting portion of said buffer, and connecting means adapted to engage and rigidly connect said supporting members and the supporting portions of said buffer.

GEORGE ALBERT LYON.